Oct. 22, 1929.  R. K. JEFFREY  1,732,365
CONVEYING MECHANISM
Filed Dec. 30, 1927  3 Sheets-Sheet 1

Inventor
Robert K. Jeffrey
By Cushman, Bryant Darby
Attorneys

Oct. 22, 1929.　　　　R. K. JEFFREY　　　　1,732,365
CONVEYING MECHANISM
Filed Dec. 30, 1927　　　3 Sheets-Sheet 2

Inventor
Robert K. Jeffrey.

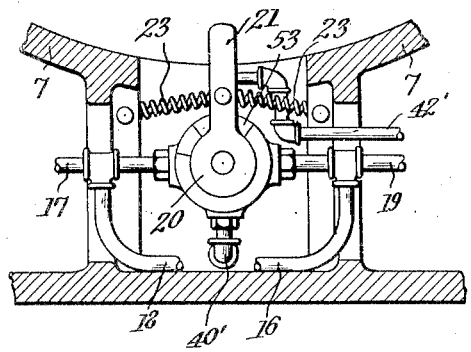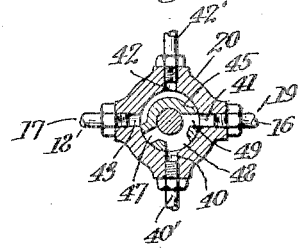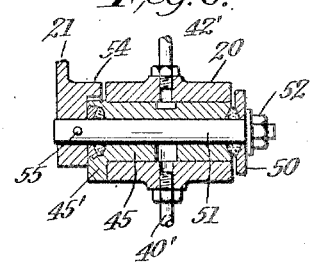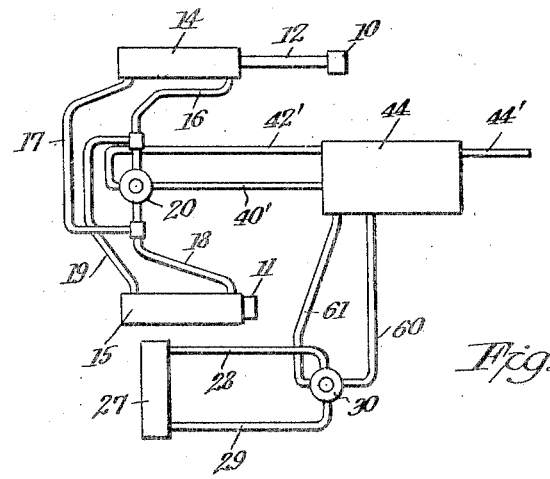

Patented Oct. 22, 1929

1,732,365

UNITED STATES PATENT OFFICE

ROBERT K. JEFFREY, OF COLUMBUS, OHIO, ASSIGNOR TO THE JEFFREY MANUFACTURING COMPANY, OF COLUMBUS, OHIO, A CORPORATION OF OHIO

CONVEYING MECHANISM

Application filed December 30, 1927. Serial No. 243,622.

This invention relates to innovations and improvements in conveying mechanism of the type wherein the material to be conveyed is propelled by longitudinal reciprocatory movements of a material-supporting surface.

According to the invention, the material-supporting surface is composed of a plurality of elongated plates arranged side by side, at least one of the plates being reciprocable, and means are provided whereby material to be conveyed is passed back and forth between the two plates so that it rests on the reciprocating plate only during the forward movement of the same. The two plates are preferably transversely arcuate and disposed to form a trough between them and in the preferred form the plates are oppositely reciprocable, while the transfer of the material from one to the other is effected by rocking the trough back and forth on a longitudinal axis. The rocking of the trough alternately brings the plates into substantially horizontal and vertical planes respectively, the plate lying in the horizontal plane carrying the material forward. The movements of the plates, both reciprocatory and rocking, are so timed that the material in the trough is always on an advancing plate, or at least upon a plate which has completed its rearward movement. Various means for effecting the required movements may be utilized, but for the sake of example I have shown in the accompanying drawings hydraulic motors, these motors being controlled by valves automatically actuated at each limit of movement of the plates. That is to say, when a material-carrying plate has reached the limit of its forward movement, it will actuate a valve which controls the rocking movement so that the material will be passed over to the plate which has been retracted. As the trough rocks to transfer the material to this latter plate, a valve is actuated which will cause the advance of that plate and the retraction of the empty plate.

Without going further into the general aspects of the invention, I shall proceed to describe it with reference to the attached drawings, which are, of course, merely intended to be illustrative of the invention and in no wise restrictive.

In the drawings:

Figure 6 is an enlargement of the lower central section of Figure 4, showing one of the operating valves.

Figure 7 is a section of the valve transversely of its axis.

Figure 8 is a section of the valve longitudinally of its axis, and

Figure 9 shows diagrammatically the hydraulic motors and their connections.

Figure 3:
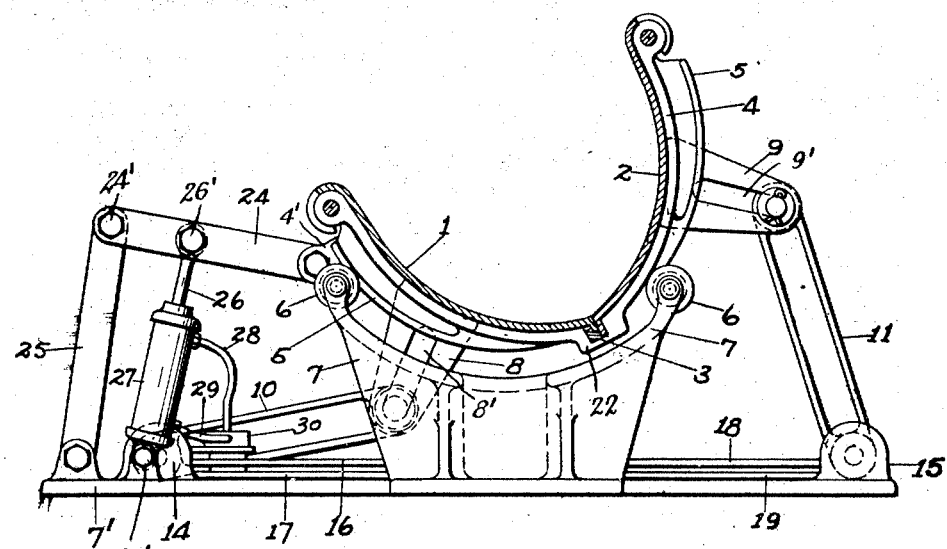
Figure 3 is a sectional view taken along the line 3—3 of Figure 2.
Figure 4:
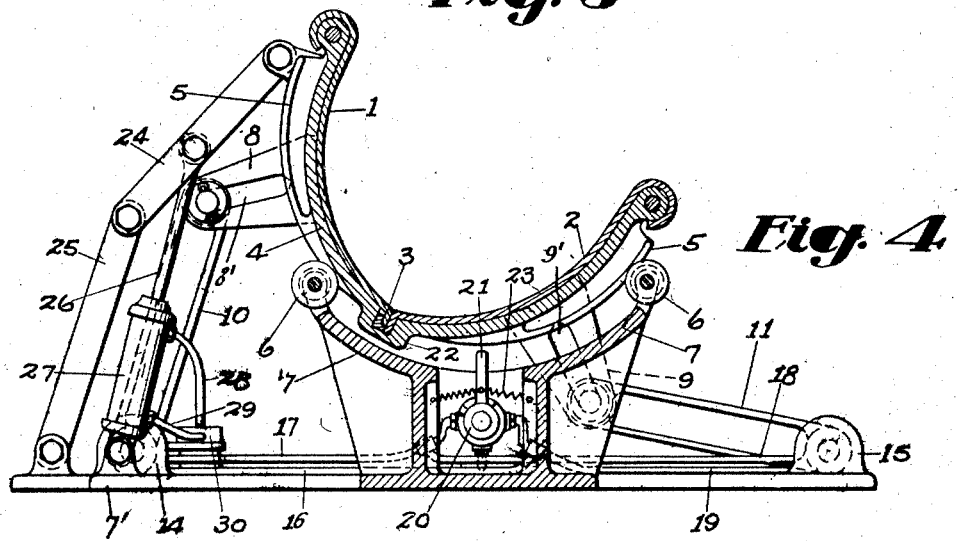
Figure 4 is a sectional view taken along the line 4—4 of Figure 2.
Figure 5:
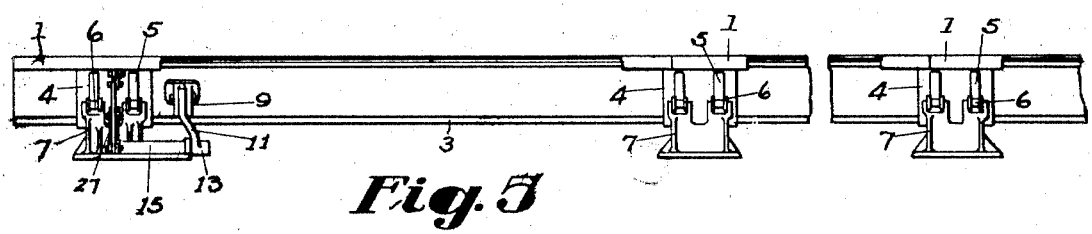
Figure 5 is a side elevation of a conveyor made up of a number of detachable trough units connected with a single actuating unit, such as is illustrated in Figures 1 and 2.

Referring now to the drawings, the conveyor trough is shown as composed of two elongated plates 1 and 2 of arcuate cross-section flanged together along their abutting edges, as shown at 3 in Figures 3 and 4. These plates are supported in a plurality of cradles 4, and are adapted to be reciprocated relative to the cradles. Each cradle has semi-circular bearing surfaces 5, here shown as being interrupted at the center portion by an offset section 22 which receives the flanged edges 3. Each cradle 4 is supported by these bearing surfaces 5 upon rollers 6 which are journalled on supporting brackets 7, these brackets being mounted upon any suitable foundation, such as a base 7'. Attached to plates 1 and 2 are radially extending lugs 8 and 9 which are provided with elongated radial slots 8' and 9' respectively. Lugs 8 and 9 are secured through slots 8' and 9' by suitable pivot pins to the ends of arms 10 and 11 fixed respectively to the outer ends of piston rods 12 and 13. Piston rods 12 and 13 are secured to piston heads reciprocable in cylinders 14 and 15 which are mounted upon base 7'. The opposite ends of cylinder 14 are connected by means of conductors 16 and 17 with a valve casing 20 mounted on bracket 7, and the ends of cylinder 15 communicate with the valve casing through conduits 18 and 19.

Valve casing 20 is provided with four equidistant ports 40, 41, 42 and 43. Conductor 16 which leads to one end of cylinder 14, and conductor 19 which leads to the opposite end of cylinder 15 are confluent and communicate with port 41 of the valve casing. Likewise, conductors 17 and 18 are confluent and are connected to port 43 of the casing. Port 40 which is the pressure inlet, is connected by means of conductor 40' with a pressure tank 44, while port 42 which is the relief port is connected by means of a conductor 42' to the pressure tank to discharge therein through suitable arrangements. A conductor 44' connects the pressure tank with a pump not shown. Rotatable within the valve chamber of casing 20 is a plug 45 provided with a circumferentially extending groove 46, and three intercommunicating radial bores 47, 48 and 49. The plug is adapted to be oscillated between two limit positions. In one of these positions, inlet port 40 is connected through bores 48 and 49 with port 41 and, consequently, conductors 16 and 19, while conductors 17 and 18 are connected through passage 46 with the relief port 42. In the other position of the plug, inlet port 40 communicates through bores 48 and 47 with port 43 and, consequently, with conductors 17 and 18, while conductors 16 and 19 are placed in communication with the relief port. Plug 45 is retained in position in casing 20 by means of a collar 45' integral therewith at one end and a washer 50 secured thereto at the other end by means of an axially extending bolt 51 and nut 52. Collar 45' has a sector-shaped discontinuation 53 at its upper edge and in this works, with a certain amount of lost motion, a lug 54 integral with an operating handle 21 which is secured to bolt 51 by means of a pin 55. Bolt 55 is rotatable in plug 45 so that upon oscillation of handle 21, the plug will not be rotated until lug 54 abuts one of the other limits of discontinuation 53. As particularly shown in Figures 4 and 6, handle 21 is normally maintained in vertical position by means of balanced springs 23.

As was mentioned above, the conveyor trough is intended to be oscillated so as to pass the material back and forth between plates 1 and 2. Through apparatus to be hereinafter described, the trough is rocked when the material-carrying plate has reached its limit of forward movement. As the trough rocks, the central offset portion 22 of cradle 4 will strike the upper end of handle 21 and force it to one side or the other against the action of springs 23. Lug 54 will abut one edge of discontinuation 53 and will move plug 45 from one limit position to the other, thereby placing the proper ports into communication so that the advanced plate will be retracted and the retracted plate advanced, the material in the meantime having been transferred to the latter. As element 22 passes off the end of handle 21, springs 23 will return the latter to normal position.

Figure 1:
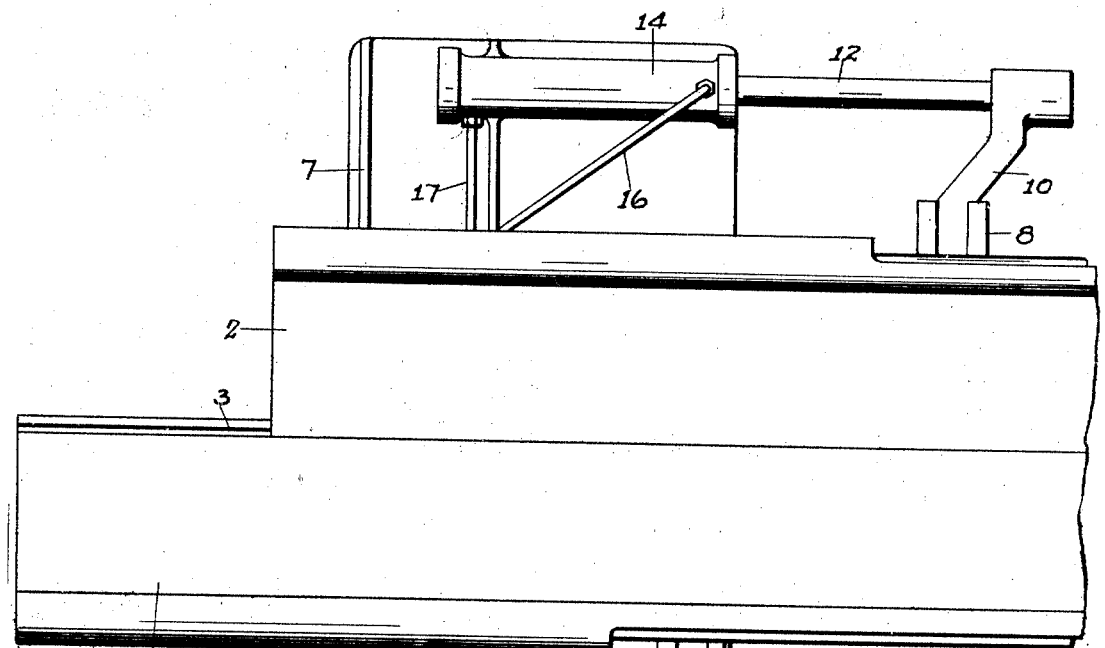
Figure 1 is a fragmentary plan view of a conveyor built in accordance with my present invention, showing in part the actuating mechanism.
Figure 2:
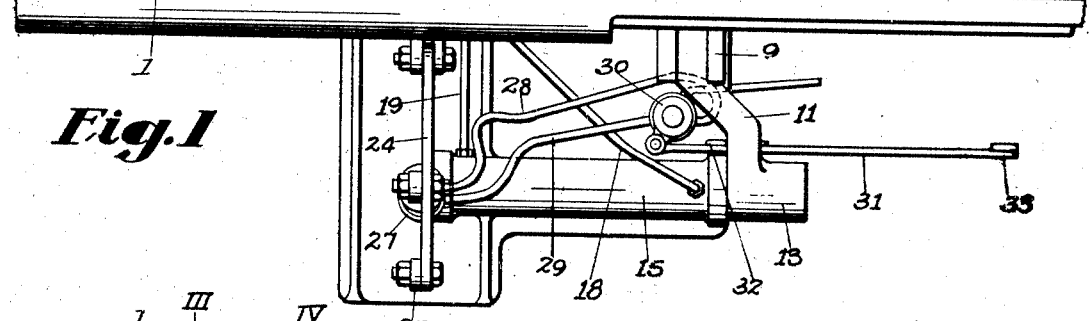
Figure 2 is a side elevation of the devices illustrated in Figure 1.
Figure 2:
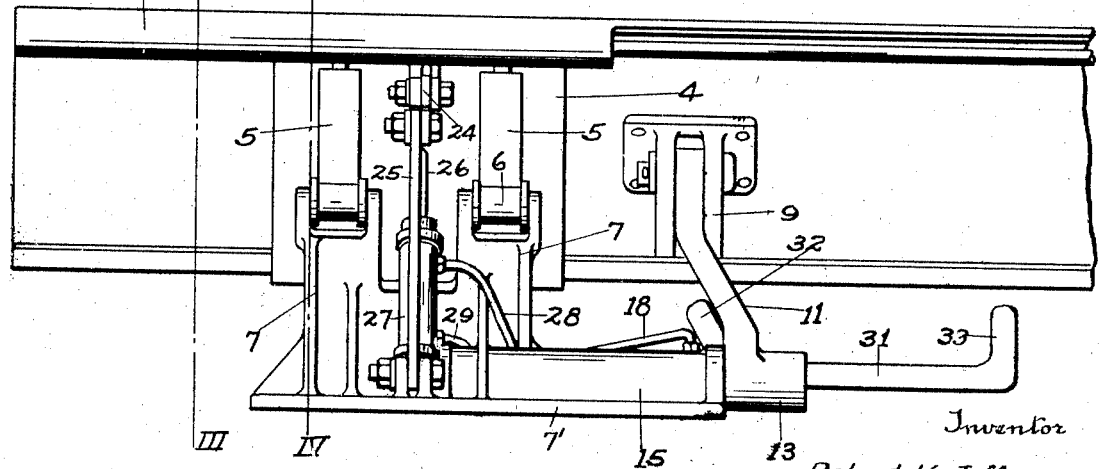

Cradle 4 has at one side a lug 4' to which is pivotally connected at one end a lever 24, the other end of the lever being fulcrumed at 24' at one end of the link 25, the other end of which is pivotally secured to the base 7' of brackets 7. A cylinder 27 pivoted at 27' to base 7' has a piston head therein which is connected by a piston rod 26 to lever 24 by a pin 26'. A valve 30 which may be similar in all respects (with the exception of the lost motion feature) to the valve above described is disposed on base 7' adjacent cylinder 27, and its ports (corresponding to ports 41 and 43 of valve 20) are connected by means of conductors 28 and 29 to opposite ends of cylinder 27. A bar 31, Figures 1 and 2, is slidably arranged on base 7' for movement in the longitudinal direction of the conveyor trough, and this arm is provided with upwardly extending fingers 32 and 33 which project in the path of reciprocation on arm 11. Also, engagement means are provided between bar 31 and the operating handle of valve 30, so that upon reciprocation of the bar the valve will be moved from one to the other limit position. Valve 30 has its inlet port connected by means of a conductor 60 with the pressure tank 44, and its relief port connected thereto by means of a conductor 61. Thus when plate 1, in the arrangement shown, has reached its forward limit of travel arm 11 will have abutted finger 32 so that bar 31 will be carried along and will actuate valve 30 so that pressure will be admitted to cylinder 27 through conductor 29, and thereupon through the outward movement of piston rod 26 the trough will be rocked from the position of Figure 3 to that of Figure 4. As above described, when the trough is thus rocked valve 20 is actuated so that plate 1 will be moved in the opposite direction. During this movement, arm 11 will strike finger 33 and at the proper moment valve 30 will be moved to the other limit position, so that pressure will be admitted to cylinder 27 through conductor 28. The trough will then be rocked from the position of Figure 4 to that of Figure 3, and the material will again be advanced on plate 1.

While the trough may be conveniently formed of two plates as described, a greater number may be provided if desired. When plates of arcuate cross-section are used, they will be laterally inclined, preferably. That is to say, they will be so disposed that the lines of the arcs will intersect rather than lie in the same circumference. In this manner, the material may be more quickly passed from one plate to the other and with less chance of spillage. Again, as particularly illustrated, the rocking movement of the trough is what may be termed specifically a rolling movement about a constant longitudinal axis, this axis being determined by the centers of semi-circular bearing faces 5. This disposition is desirable in that the material is slid, rather than thrown from one plate to the other. It is to be understood, however, that the rocking center can be placed at any other suitable point without departing from the spirit of the invention.

Having thus described my invention, what I claim is:

1. In an apparatus of the class described, a pair of elongated horizontally-extending plates arranged side by side, means to reciprocate one of said plates relative to the other, and means to pass material to be conveyed directly back and forth in opposite directions between said plates whereby said material will rest on said reciprocating plate only during the forward movement of the same.

2. In an apparatus of the class described, a pair of elongated horizontally-extending plates arranged side by side, means to reciprocate one of said plates relative to the other, and means to rock said plates back and forth about a longitudinal axis to transfer material to be conveyed back and forth from one to the other whereby the material rests on said reciprocating plate only during the forward movement of the same.

3. In an apparatus of the class described, a pair of elongated horizontally-extending plates arranged side by side, means to oppositely reciprocate said plates, and means to transfer material to be conveyed from one plate to the other in opposite directions whereby said material is caused to rest always on the forwardly moving plate.

4. In an apparatus of the class described, a pair of elongated horizontally-extending plates arranged side by side, means to oppositely reciprocate said plates, and means to rock said plates back and forth about a longitudinal axis to pass material to be conveyed back and forth between them whereby said material is caused to rest always on the forwardly moving plate.

5. In an apparatus of the class described, an open-topped trough comprising a pair of elongated horizontally-extending plates arranged side by side, means to reciprocate one of said plates longitudinally relative to the other, and means to move material in said trough transversely of the latter onto said reciprocating plate to advance therewith and to move said material in the opposite transverse direction to deposit it on the other plate to prevent its retraction with said reciprocating plate.

6. In an apparatus of the class described, a trough comprising a pair of elongated horizontally-extending plates arranged side by side, means to reciprocate one of said plates longitudinally relative to the other, and means to rock said trough back and forth about a longitudinal axis to transfer material therein from one plate to the other whereby the material rests on said reciprocating plate only during the forward movement of the same.

7. In an apparatus of the class described, a trough comprising a pair of elongated horizontally-extending plates arranged side by side, means to oppositely reciprocate said plates, and means to transfer material to be conveyed directly from one plate to the other, in opposite directions whereby said material is caused to rest always on the forwardly moving plate.

8. In an apparatus of the class described, a trough comprising a pair of elongated horizontally-extending plates arranged side by side, means to oppositely and simultaneously reciprocate said plates, and means to transfer material to be conveyed directly from one plate to the other in opposite directions whereby said material is caused to rest always on the forwardly moving plate.

9. In an apparatus of the class described, a trough comprising a pair of elongated horizontally-extending plates arranged side by side, means to oppositely reciprocate said plates, and means to rock said trough back and forth about a longitudinal axis to transfer material therein from one plate to the other whereby said material is caused to rest always on the forwardly moving plate.

10. In an apparatus of the class described, a trough comprising a pair of elongated horizontally-extending plates arranged side by side, means to oppositely and simultaneously reciprocate said plates, and means to rock said trough back and forth about a longitudinal axis to transfer material therein from one plate to the other whereby said material is caused to rest always on the forwardly moving plate.

11. In an apparatus of the class described, a pair of elongated horizontally-extending plates disposed in lateral contact and transverse angular relation to form a trough between them, means to rock said trough back and forth about a longitudinal axis to bring the plates alternately into substantially horizontal and vertical planes respectively, and means to oppositely reciprocate said plates, as and for the purpose described.

12. In an apparatus of the class described, a pair of elongated horizontally-extending plates disposed in lateral contact and transverse angular relation to form a trough between them, means to rock said trough back and forth about a longitudinal axis to bring the plates alternately into substantially horizontal and vertical planes respectively, and automatically controlled means to oppositely reciprocate said plates, as and for the purpose described.

13. In an apparatus of the class described, a pair of elongated horizontally-extending plates disposed in lateral contact and transverse angular relation to form a trough between them, means to roll said trough back and forth about a constant longitudinal axis to bring the plates alternately into substantially horizontal and vertical planes respectively, and means to oppositely reciprocate said plates as and for the purpose described.

14. In an apparatus of the class described, a pair of elongated horizontally-extending plates disposed in lateral contact and transverse angular relation to form a trough between them, means to roll said trough back and forth about a constant longitudinal axis to bring the plates alternately into substantially horizontal and vertical planes respectively, and automatically controlled means to oppositely reciprocate said plates as and for the purpose described.

15. In an apparatus of the class described, a pair of elongated horizontally-extending plates disposed in lateral contact and transverse angular relation to form a trough between them, means to rock said trough back and forth about a longitudinal axis to bring the plates alternately into substantially horizontal and vertical planes respectively, means to oppositely reciprocate said plates, and means automatically actuated at the reciprocatory limits of said plates to control said rocking means.

16. In an apparatus of the class described, a pair of elongated horizontally-extending plates disposed in lateral contact and transverse angular relation to form a trough between them, means to rock said trough back and forth about a longitudinal axis to bring the plates alternately into substantially horizontal and vertical planes respectively, means to oppositely reciprocate said plates, and means automatically actuated upon the rocking of said trough to control said reciprocating means.

17. In an apparatus of the class described, a pair of elongated horizontally-extending plates of arcuate cross-section disposed in lateral contact and transverse angular relation to form a trough between them, means to rock said trough back and forth about a longitudinal axis to bring the plates alternately into substantially horizontal and vertical planes respectively, and means to oppositely reciprocate said plates, as an for the purpose described.

18. In an apparatus of the class described, a pair of elongated horizontally-extending plates of arcuate cross-section disposed in lateral contact and transverse angular relation to form a trough between them, means to rock said trough back and forth about a longitudinal axis to bring the plates alternately into substantially horizontal and vertical planes respectively, and automatically controlled means to oppositely reciprocate said plates, as and for the purpose described.

19. In an apparatus of the class described, a pair of elongated horizontally-extending plates disposed in lateral contact and transverse angular relation to form a trough, a semi-circular cradle for supporting said trough, bearings supporting said cradle, means to roll said cradle back and forth on said bearings, and means to oppositely reciprocate said plates relative to said cradle, as and for the purpose described.

20. In an apparatus of the class described, a trough comprising a pair of elongated horizontally extending plates arranged side by side, means to oppositely reciprocate said plates, means to rock said trough back and forth about a longitudinal axis to transfer material from one plate to the other whereby said material is caused to rest always on the forwardly moving plate, and control means for said reciprocating means actuated in dependence upon the rocking movement of the trough.

21. In an apparatus of the class described, a trough comprising a pair of elongated horizontally extending plates arranged side by side, means to oppositely reciprocate said plates, means to rock said trough back and forth about a longitudinal axis to transfer material from one plate to the other whereby said material is caused to rest always on the forwardly moving plate, and control means for said rocking means actuated in dependence upon the reciprocating movement of one of said plates.

22. In an apparatus of the class described, a trough comprising a pair of elongated horizontally extending plates arranged side by side, means to oppositely reciprocate said plates, means to rock said trough back and forth about a longitudinal axis to transfer material from one plate to the other whereby said material is caused to rest always on the forwardly moving plate, and control means for said rocking means actuated by one of said plates at the limits of its reciprocating movement.

23. In an apparatus of the class described, a trough comprising a pair of elongated horizontally extending plates arranged side by side, means to oppositely reciprocate said plates, means to rock said trough back and forth about a longitudinal axis to transfer material from one plate to the other whereby said material is caused to rest always on the forwardly moving plate, control means for said rocking means, and means on one of said plates for actuating said control means as the said plate moves.

24. In an apparatus of the class described, a trough comprising a pair of elongated horizontally extending plates arranged side by side, means to oppositely reciprocate said plates, means to rock said trough back and forth about a longitudinal axis to transfer material from one plate to the other whereby said material is caused to rest always on the forwardly moving plate, control means for said reciprocating means, and means on said trough for actuating said control means during the rocking movement of the trough.

25. In an apparatus of the class described, a trough comprising a pair of elongated horizontally extending plates arranged side by side, means to oppositely reciprocate said plates, means to rock said trough back and forth about a longitudinal axis to transfer material from one plate to the other whereby said material is caused to rest always on the forwardly moving plate, control means for said reciprocating means actuated in dependence upon the rocking movement of the trough, and control means for said rocking means actuated in dependence upon the reciprocatory movements of said plates.

26. In an apparatus of the class described, a trough comprising a pair of elongated horizontally extending plates arranged side by side, means to oppositely reciprocate said plates, means to rock said trough back and forth about a longitudinal axis to transfer material from one plate to the other whereby said material is caused to rest always on the forwardly moving plate, control means for said reciprocating means, and a lost-motion actuating member for said control means operated by said trough during its rocking movement.

In testimony whereof I have hereunto set my hand.

ROBERT K. JEFFREY.